United States Patent
Claflin et al.

[15] 3,658,359
[45] Apr. 25, 1972

[54] HINGED FOLD-UP LANDING SUPPORT

[72] Inventors: Hyle K. Claflin, North Muskegon; Jack T. Belke, Grand Rapids, both of Mich.

[73] Assignee: Westran Corporation, Muskegon, Mich.

[22] Filed: Dec. 9, 1970

[21] Appl. No.: 96,541

[52] U.S. Cl. ............................................280/150.5, 254/86 R
[51] Int. Cl. .........................................................B60s 9/02
[58] Field of Search ......................280/150.5, 415 B, DIG. 8; 254/86

[56] References Cited

UNITED STATES PATENTS

| | | | |
|---|---|---|---|
| 3,182,957 | 5/1965 | Dalton | 254/86 R |
| 2,926,889 | 3/1960 | Obes | 280/150.5 |
| 3,104,891 | 9/1963 | Dalton | 280/150.5 |
| 3,454,251 | 7/1969 | Dye | 280/150.5 |

Primary Examiner—Benjamin Hersh
Assistant Examiner—Robert R. Song
Attorney—Hauke, Gifford and Patalidis

[57] ABSTRACT

A landing gear support including a pair of legs secured to opposite sides of the forward portion of a trailer to support the same and movable between an extended operable position and a retracted inoperable position. Each of the legs may also be folded inwardly to a horizontal position beneath the trailer. Each of the legs includes a gearing mechanism such that with the use of a manual crank the legs may be moved between their retracted and extended positions. A separate gear housing is associated with each of the legs and the housings are connected together by a shaft extending therebetween such that a single crank may be used to move the legs between their positions. When the legs are moved to their folded position beneath the trailer, the two gear housings and the shaft extending therebetween are moved to an upper position beneath the trailer.

12 Claims, 10 Drawing Figures

PATENTED APR 25 1972 3,658,359

INVENTORS
HYLE K. CLAFLIN
JACK T. BELKE
BY
Hauke Gifford & Patalidis
Attorneys

INVENTORS
HYLE K. CLAFLIN
JACK T. BELKE

INVENTORS
HYLE K. CLAFLIN
JACK T. BELKE
BY
*Hauke Gifford & Patalidis*
Attorneys

HINGED FOLD-UP LANDING SUPPORT

BACKGROUND OF THE INVENTION

I. Field of the Invention

The invention relates broadly to landing gears for trailers or similar vehicles and more particularly to a landing gear which may be folded inwardly to a horizontal position beneath the trailer body.

II. Description of the Prior Art

Heretofore, retractable landing gear have included linkage whereby the supporting legs or struts, provided at their ends with small wheels, casters or the like, have been movable from an extended operative position wherein the wheels contact the ground to a retracted inoperative position. Usually the shift of these legs or struts from one position to the other is brought about by the manual operation of a crank.

Many of these have also included means for folding the landing gear to a folded position beneath the trailer. None, however, to our knowledge have permitted the landing gear to be folded to a position which permits the trailer to be moved forwardly on the tractor. This of course requires that no part of the landing gear be positioned so far beneath the lower portion of the trailer as to form an obstruction when the landing gear is in the folded up position.

SUMMARY OF THE INVENTION

Oftentimes it is desirable to connect a first trailer onto the rear end of a tractor and to connect a second trailer onto the rear end of the first trailer, such that the tractor pulls two trailers in line. In some states this type of tractor-trailer arrangement is prohibited by law. Thus, heretofore it has been necessary to drive around those states when pulling two trailers in line or, alternately, to individually pull each of the trailers across the state prohibiting such an arrangement. A number of states which prohibit the pulling of two trailers in line do allow a straight truck, one having no articulation between the tractor and trailer, to pull a single trailer. Thus, in crossing such states the first trailer may be moved farther forwardly onto the rear end of the tractor and secured thereon, eliminating the pivot point therebetween. In such an arrangement, the tractor and the first trailer qualifies as a straight truck, since there is no pivot point therebetween, and the second trailer can be pulled by the "straight truck." Thus, the tractor could pull two trailers across those states, greatly reducing the expense of driving around those states or individually pulling the trailers thereacross. Heretofore, this type of arrangement has been impossible due to the landing gear on the trailers, preventing the semi-trailer from being moved further onto the tractor.

There are of course other situations where it might be desirable to convert a tractor-trailer combination to a truck and the landing gear of the present invention permits this. The landing gear includes a pair of legs disposed near the front of the trailer on opposite sides thereof which may be moved from an extended operative position, whereby the lower end contacts the ground to support the front of the trailer, to a retracted position wherein the legs extend vertically downwardly but are of such a length that the ends do not contact the ground. The landing gear legs may then be folded under the trailer body to a horizontal position, allowing the trailer to be moved farther onto the tractor and to be secured thereon such that there is no pivot point between the trailer and the tractor.

The landing gear also includes a pair of outer plates each hinged at their upper edge to opposite sides of the front portion of the trailer so as to swing transversely of the trailer body. Each plate has one of the legs and a gear housing associated therewith secured to the inner surface. Each of the gear housings is connected to its associated leg and the housings are connected together by means of a shaft extending therebetween, such that by means of a single manual crank both of the legs may be moved from their extended operative position to their retracted positions.

Once the two legs have been cranked to their retracted inoperative position, a latching mechanism may be disengaged and the legs swung inwardly to a horizontal position beneath the trailer body, with the two gear housings and the shaft extending therebetween rotating upwardly so as to be positioned above the two outer plates and out of the way. In the folded-up position, the trailer may be pushed forwardly onto the rear end of the tractor, allowing the trailer to be fixed thereto and eliminating the pivot point between the trailer and the tractor so that the combination becomes in effect a truck.

DESCRIPTION OF THE DRAWINGS

A better understanding of the present invention will be apparent upon reference to the following description. The description refers to the accompanying drawings in which like reference characters refer to like parts throughout the several views and in which.

DESCRIPTION OF THE PREFERRED EMBODIMENT

Figure 1:
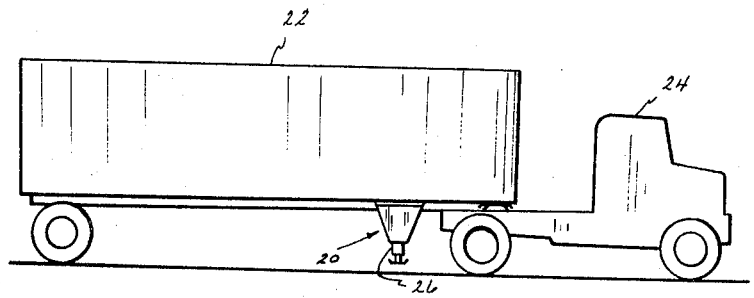
FIG. 1 is a side elevational view of a conventional tractor and trailer utilizing the landing gear of the present invention.

Referring to FIG. 1, the landing gear of the present invention, generally indicated at 20, is shown connected to the forward portion of a trailer 22 immediately to the rear of the portion of the trailer 22 which is pivotally connected to the rear end of a tractor 24. The landing gear 20 is shown in the unfolded position with the landing gear legs 26 in the retracted position. In this position, the tractor 24 may pull the trailer 22 to its destination. Upon reaching the destination, the landing gear legs 26 are cranked down to their extended position, such that the trailer 22 may be detached from the tractor 24 with the forward portion of the trailer 22 resting upon the landing gear 20. As long as only a single trailer 22 is to be used with the tractor 24, the landing gear 20 can remain in its unfolded position and the legs 26 cranked between their extended and retracted position as needed.

Figure 2:
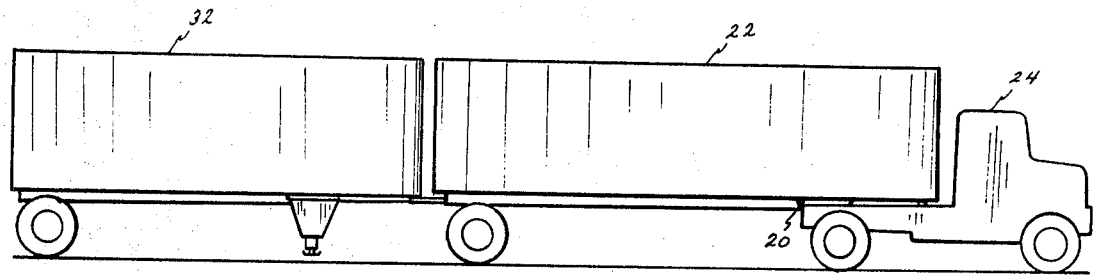
FIG. 2 is a side elevational view of a tractor and a first trailer with the landing gear folded up out of the way and non-pivotally secured to the rear end of the tractor, and a second trailer pivotally secured to the rear end of the first trailer.

Referring to FIG. 2, when it is desired to pull two trailers in line behind a tractor, it is advantageous to have a landing gear which folds up under the trailer body. When passing through states which prohibit pulling two trailers behind a tractor, but which permit a truck to pull a trailer, it is necessary to move the first trailer farther onto the rear end of the tractor and fixedly secure it thereto, eliminating the pivot point between the tractor and the first trailer. Thus, the tractor and the first trailer will qualify as a "straight truck" and the second trailer will be considered as the only trailer being pulled behind the truck. As illustrated in FIG. 2, the trailer 22 has been moved forwardly and its front portion is fixed to the rear end of the tractor 24. The connection illustrated in FIG. 2 constitutes a solid connection such that the trailer 22 does not pivot with respect to the tractor 24, constituting a "straight truck." Thus, in those states which prohibit two trailers from being pulled by a single tractor, the arrangement in FIG. 2 allows a second trailer 32 to be secured onto the rear end of the first trailer 22 and pulled through the respective state. Once the tractor has passed through the state, the trailer 22 may be moved backwards on the tractor 24 to the relative position illustrated in FIG. 1, such that the trailer 22 is pivotally connected to the tractor 24 and the trip continues with both trailers 22 being pulled by the tractor 24, but with articulated joints between the trailers 32 and 22 and between the trailer 22 and the tractor 24. This provides for easier maneuverability and greater control than in the situation when the trailer 22 is non-pivotally fixed to the tractor 24.

There are also times such as in city driving where it is desirable to combine a single trailer and tractor into a straight truck without connecting a second trailer to the "truck."

It will be noted that when the trailer 22 is pushed farther onto the tractor 24 to form a solid connection therebetween, the landing gear as illustrated at 20 in FIG. 2 is above the rear end of the tractor 24. Thus, in order to be able to push the trailer 22 farther onto the tractor 24, the landing gear 20 must be constructed such that it will fold up completely under the trailer 22 without creating an obstruction in the form of portions disposed below the trailer to the extent that the landing gear would interfere with the rear end of the tractor 24.

Figure 3:
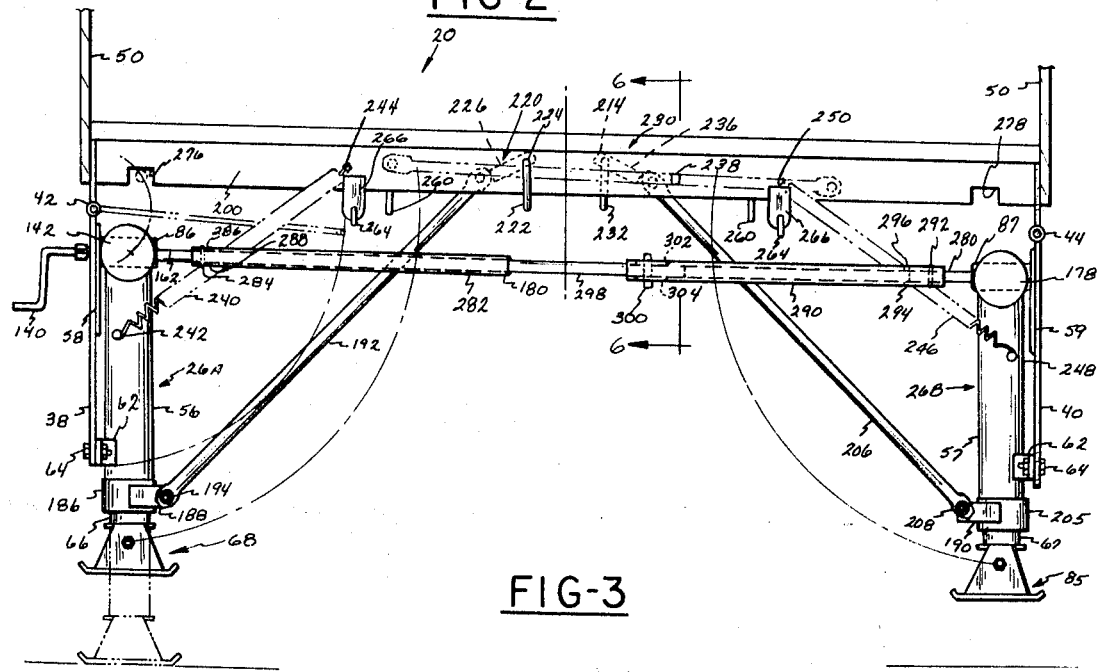
FIG. 3 is a front elevational view of the landing gear of the present invention in its retracted unfolded position.
Figure 4:
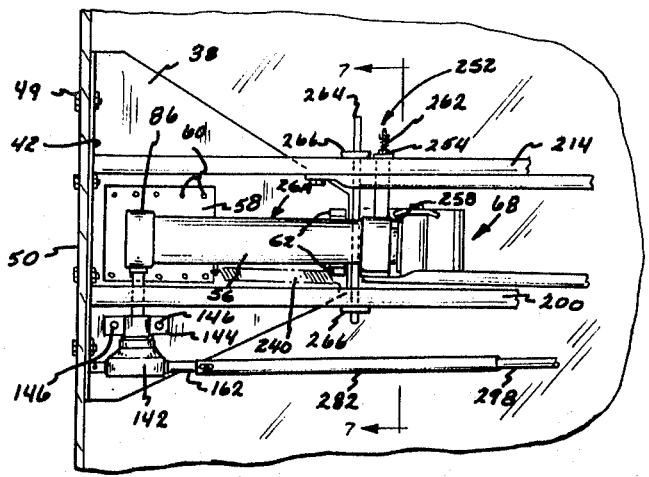
FIG. 4 is a top plan view of one side of the landing gear of the present invention in its folded-up position.
Figure 5:
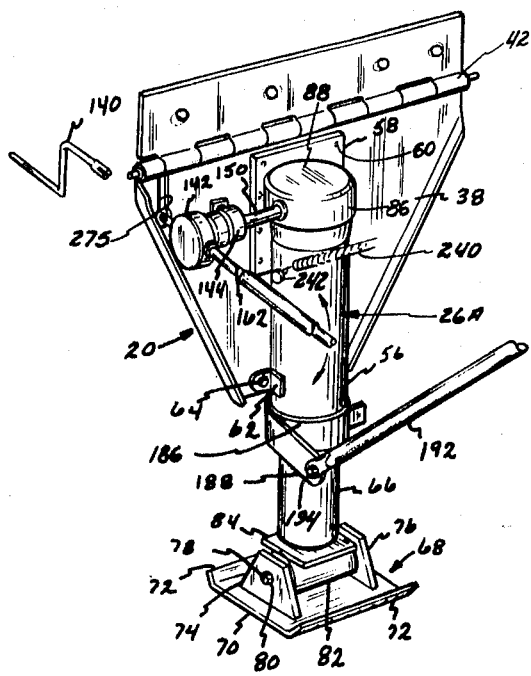
FIG. 5 is a perspective view of one side of the landing gear of the present invention in its extended position.

Referring to FIGS. 3, 4 and 5, the landing gear 20 of the present invention includes a pair of triangular outer plates 38 and 40 secured along their top edge by means of piano hinges 42 and 44, respectively, to the frame 50 of the trailer 22 so that two plates 38 and 40 are pivotally mounted to the trailer 22. Two landing gear legs 26A and 26B are secured to the inner surface of the plates 38 and 40, respectively. The legs 26A and 26B include outer tubular housings 56 and 57, respectively, each having a generally circular cross-sectional area. The housings 56 and 57 have their upper ends secured to rectangular plates 58 and 59, respectively, which are secured to the inner surfaces of the plates 38 or 40, respectively, by means of bolts, rivets or the like as at 60. The housings 56 and 57 each include a pair of L-shaped tabs as at 62 having one end secured to the respective housing as by welding, bonding or the like and the other end secured to the lower portion of one of the plates 38 or 40 by means of a bolt 64. Thus, the outer housings 56 and 57 are fixedly secured to the inner surface of the plates 38 or 40, respectively.

Elongated tubular members 66 and 67 are slidably received in the lower end of the tubular housings 56 and 57, respectively, and have a generally circular cross-sectional area. Referring to FIG. 5, member 66 includes a landing gear foot, generally indicated at 68, secured to its lower end for engaging the ground to support the forward portion of the trailer. The landing gear foot 68 includes a generally flat rectangular ground engaging member 70 having a pair of upwardly extending flanges 72 formed at each end thereof. A pair of spaced apart upwardly extending tabs 74 and 76 are secured to the upper surface of the member 70 as by welding, bonding or the like and are formed with apertures 78 therethrough. A shaft 80 is mounted in the pair of apertures 78 between the pair of tabs 74 and 76 and has a tubular sleeve 82 pivotally mounted therearound. A rectangular plate 84 is secured to the lower end of the tubular member 68 as by welding, bonding or the like and has its lower surface secured to the tubular sleeve 82 as by welding, bonding or the like, such that the landing gear foot 68 is pivotally mounted on the lower end of the tubular member 66.

The tubular members 66 and 67 are slidably mounted within the tubular housings 56 and 57 respectively between a retracted position and an extended position wherein the landing gear foot 68 and a similar landing gear foot 85 secured to the lower end of the member 67 engage the ground to support the forward portion of the trailer. Referring to FIGS. 3, 5, 8, 9 and 10, the mechanism for mechanically raising and lowering the tubular members 66 and 67 includes similar housings 86 and 87 formed at the top of the tubular housings 56 and 57.

Figure 10:
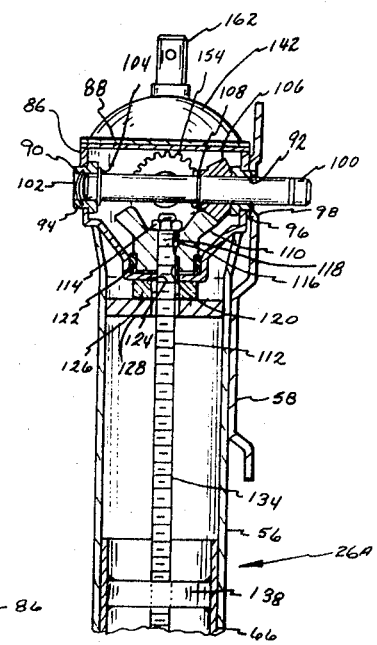
FIG. 10 is a cross-sectional view taken on line 10—10 of FIG. 9.

As shown in FIG. 10, the housing 86 is closed at one end by a circular plate 88 secured thereon as by welding, bonding or the like. The housing 86 includes a pair of in-line apertures 90 and 92 formed therein on opposite sides of the housing for receiving a pair of bushings 94 and 96, respectively. An aperture 98 is formed in the plate 58 with the bushing 96 extending therein. A pinion crank shaft 100 has one end journalled in the bushing 94 and extends across the interior of the housing 86 and through the bushing 96 and the aperture 98 with its end disposed outside of the housing 86. The bushing 94 includes a welch plug 102 disposed therein to prevent dirt and other particles from entering the bushing and causing deterioration thereof. The shaft 100 has a roller pin 104 extending therethrough adjacent the inner surface of the bushing 94 to prevent the shaft from pushing into the bushing 94. A pinion bevel gear 106 is secured on the shaft 100 adjacent the inner surface of the bushing 96 to maintain the position thereof and maintain the position of the shaft within the set of bushings 94 and 96.

Still referring to FIG. 10, a bevel gear 110, which is engaged by the bevel gear 106, is secured on a rotatably mounted screw shaft 112 by means of a nut 114. The bevel gear 110 is secured to the shaft 112 by means of a key 116 disposed in a keyway 118 machined in the shaft 112 and a keyway 120 formed in the bevel gear 110, such that rotation of the bevel gear 110 by the gear 106 rotates the shaft 112. The lower end of the gear 110 is seated on a bushing 122 which rests upon the lower portion of the housing 86 adjacent an aperture 124 formed therein through which the shaft 112 extends. A bearing 126 is disposed around the shaft 112 immediately below the aperture 124 and rests upon a collar 128 extending around the shaft 112 and secured to the inner surface of the housing 56 as by welding, bonding or the like.

The shaft 112 is threaded through its entire length as shown and its lower end is received in a nut 138 disposed within the tubular member 66 and secured therein as by welding, bonding or the like. Thus, as the shaft 100 is rotated, rotating the bevel gear 106, the bevel gear 110 is rotated, thereby rotating the shaft 112, which engages the nut 138 and pulls the member 66 to its upper retracted position or pushes it down to its lower extended position. Referring to FIG. 5, a crank 140 is provided for engaging the outer end of the shaft 100 to permit manual rotation of the shaft. Referring to FIGS. 4, 5, 8 and 9, a gear box 142 is pivotally mounted to the inner surface of the plate 138 by means of a bearing mounting bracket 144 and a pair of screws 146 for reasons to be described. The gear box 142 is closed at one end by means of a circular plate 148 secured thereto as by screws (not shown) or the like. As can best be seen in FIG. 9, the box 142 is connected into the housing 86 by means of a shaft 150 having one end rotatably mounted in a bushing 152 secured in the side of the housing 86 and extending into the housing. A bevel gear 154 (FIG. 10) is secured onto the end of the shaft 150 within the housing 86 and is engaged with the bevel gear 110, such that as the gear 110 is turned by the gear 106 and the shaft 100, the gear 154 and the shaft 150 are simultaneously rotated thereby. As can best be seen in FIG. 9, the other end of the shaft 150 extends through an aperture 156 formed in the gear box 142 and has a bevel gear 158 secured on its inner end by means of a nut 160, such that the gear 158 rotates with the shaft 150. A second shaft 162 extends through the housing 142 at an angle substantially perpendicular to that of shaft 150 and is rotatably mounted in a pair of bearings 164 and 166 mounted in the box 142. The shaft 162 has a roll pin 172 extending therethrough adjacent the inner surface of the bushing 168 to maintain the position of the shaft therein. A bevel gear 174 is secured around the shaft 162 by means of a pin 176 adjacent the inner surface of the bushing 170 and is engaged with the gear 158 such that as the gear 158 is turned by the shaft 150, the gear 174 and the shaft 162 are rotated thereby.

As can best be seen in FIG. 3, the gear box 142 is connected to a similar gear box 178 by means of a shaft 180, which telescopingly receives the shaft 162 as will be described in more detail hereinafter. The gear box 178 is pivotally secured to the inner surface of the plate 40 in the same manner in which the gear box 142 is secured to the plate 38. The gear box 178 is connected by means of a shaft to the leg 26B in similar fashion to the connection between the box 142 and the leg 26A. The internal gearing of the leg 26B is similar to the internal gearing of the leg 26A. Thus, when the crank 140 is connected onto the end of the shaft 100 which protrudes through the plate 58 and the plate 38 for rotating the same, the gear 106 is simultaneously rotated thereby, rotating the gear 110 and the shaft 112, raising or lowering the member 66 to move leg 26A of the landing gear between its retracted position and its extended position. Simultaneously with the raising or lowering of the member 66, the gear 154 is rotated, rotating the shaft 150 which, in turn, rotates the gear 158, rotating the gear 174 and the shaft 162, which rotates the shaft 180. The shaft 180 extends into the gear box 178, which is connected to the leg 26B, raising and lowering the landing gear leg 26B in similar fashion to the landing gear leg 26A. Thus, as the crank 140 is manually turned, both of the landing gear legs 26A and 26B are simultaneously raised or lowered. It will be noted that with the crank 140 connected to the shaft 100 there is approximately a 4:1 ratio between the rotation of the crank 140 and the rotation of the shaft 112 to raise and lower the landing gear legs 26A and 26B.

Figure 8:
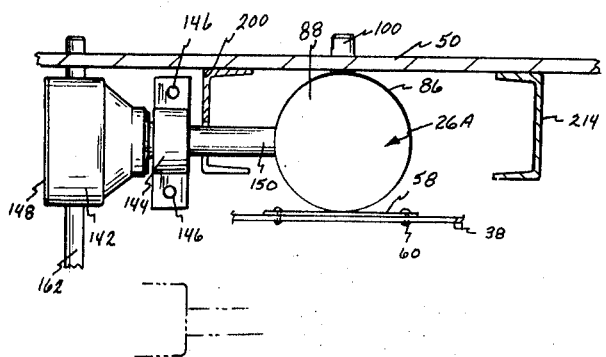
FIG. 8 is a side cross-sectional view of the landing gear in its folded-up position illustrating the connection between the gear housing and the top of the landing gear leg.
Figure 9:
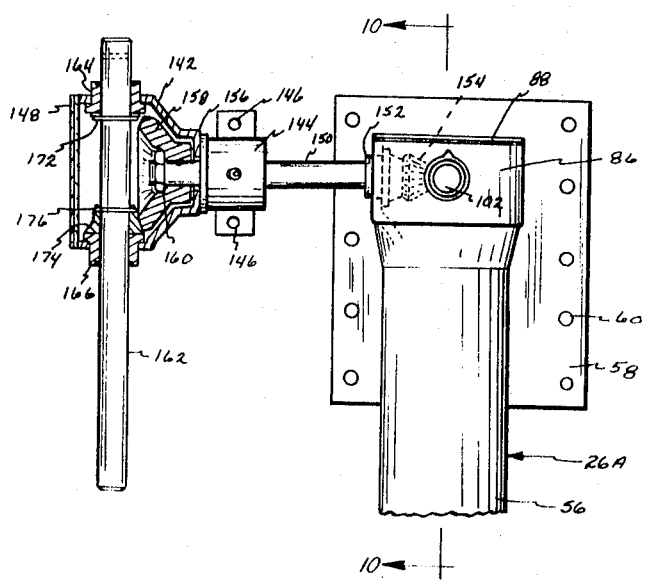
FIG. 9 is a partial cross-sectional top view of the landing gear in its folded-up position showing the detailed construction within the gear housing.

Referring to FIGS. 5, 8 and 9, it is noted that the shaft 162 extends out of the housing 142 and through a slot 182 formed in the plate 38, such that the crank 140 may, alternatively, be connected onto the end of the shaft 162 instead of the end of the shaft 100 to raise and lower the landing gear legs 26A and 26B. The ratio between the rotation of the crank and the rotation of the shaft 112 when the shaft 162 is used and thus the gear box 142 is utilized is approximately 9:1.

Oftentimes it is desirable to fold the landing gear 20 up under the trailer frame 50 in a horizontal position so as to permit the trailer to be pushed further onto the tractor to be and fixedly secured thereon so as to convert the tractor-trailer combination into a truck. The landing gear of the present invention includes a fold-up mechanism which enables the landing gear 20 to be folded up under the trailer frame in a horizontal position. Referring to FIGS. 3 and 5, the tubular housing 56 includes a reinforcement ring 186 secured therearound as by welding, bonding or the like, and has a tab 188 extending outwardly therefrom. An elongated brace 192 has one end pivotally mounted to the end of the tab 188 by means of a bolt and nut, generally indicated at 194, and extends upwardly and inwardly therefrom and as can best be seen in FIG. 6, the other end of the brace 192 is pivotally mounted to a roller 196 by means of a bolt 198. The roller 196 is mounted in an inwardly facing U-shaped channel member 200 which extends between the two plates 46 and 48 and is secured thereto as by welding, bonding or the like immediately beneath the trailer frame 50. The channel member 200 may also be secured to the bottom surface of the trailer frame 50 as by welding, bonding or the like. The channel member 200 includes an elongated L-shaped member 202 having one edge secured to the lower surface thereof and the second edge extending upwardly from the lower inner edge thereof to form a slot 204 for the roller 196. Thus, the lower end of the brace 192 is pivotally mounted to the lower end of the housing 56 and extends upwardly and inwardly to the channel member 200.

Figure 6:
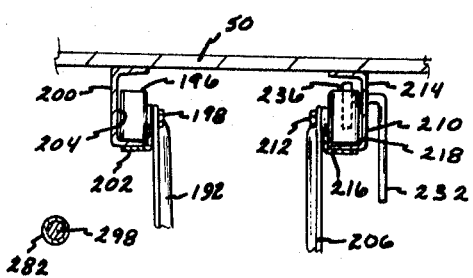
FIG. 6 is a side cross-sectional view taken mid-way between the two legs of the landing gear and illustrating the guide channels.

Still referring to FIGS. 3, and 6, the tubular housing 57 also includes a reinforcement ring 205 secured therearound as by welding, bonding or the like and has a tab 190 extending outwardly therefrom. A second elongated brace 206 extends upwardly and inwardly from the tab 190 and has one end pivotally secured thereto as by a nut and bolt, generally indicated at 208. The other end of the brace 206 is pivotally secured to a roller 210 by means of a bolt 212. The roller 210 is mounted in an inwardly facing U-shaped channel member 214 which extends between the two plates 46 and 48 and is secured thereto as by welding, bonding or the like immediately beneath the trailer frame 50. The channel member 214 may also be secured to the underside of the trailer frame 50 in a position parallel to the channel member 200. The channel member 214 includes an elongated L-shaped member 216 which has one end secured to the bottom surface of the channel member 214 and the second end extending upwardly from the lower inner edge thereof to form a slot 218 for receiving the roller 210.

When the landing gear leg is in its vertical position, as illustrated in FIG. 3, the brace 192 is maintained in its diagonal position for supporting the leg 26A by means of a locking assembly 220. The locking assembly 220 is pivotally mounted on the channel member 200 immediately above the slot 204 by means of a lock arm 222 pivotally mounted in an aperture 224 formed therein. A lock bar 226 has one end secured to the arm 222 and extends downwardly therefrom into the slot 204 with its free end engaging the roller 196, preventing the roller 196 from rolling in the slot 204 towards the leg 54, and, thus, preventing the leg 52 from pivoting inwardly on the piano hinge 42. When it is desired to permit the leg 26A to be folded up beneath the trailer frame 50, the arm 222 is used to pivot the bar 226 upwardly to permit the roller 196 to roll inwardly past the bar 226.

Still referring to FIG. 3, a locking assembly 230 is provided for maintaining the brace 206 in its diagonal position, and holding the leg 26B in its vertical position. The locking assembly 230 is shown in FIG. 6 and is substantially the same as the locking assembly 220. The assembly 230 is pivotally mounted on the channel member 214 immediately above the slot 218 by means of a lock arm 232 pivotally mounted in an aperture 234 formed therein. A lock bar 236 has one end secured to the arm 232 and extends downwardly therefrom into the slot 218 with its free end engaging the roller 210, preventing the roller 210 from moving along the slot 218 toward the leg 26A, and thus maintaining the leg 26B in its vertical position. The lock arm 232 may be pulled toward the leg 26B, pivoting the lock bar 236 about its one end and raising its free end, allowing the roller 210 to move along the slot 218 towards the leg 26A, folding the leg 26B about its hinge 44 and to a position beneath the trailer. Thus, the locking assemblies 220 and 230 are provided for securing the two legs 26A and 26B in their vertical positions and may be released such that the legs 26A and 26B may be pivoted about their hinges 42 and 44, respectively, and moved beneath the trailer.

Thus, when it is desired to push the trailer 22 farther onto the tractor 24, the lock arms 222 and 232 are pulled toward the legs 26A and 26B, respectively, pivoting the lock bars 226 and 236 upwardly, releasing the rollers 196 and 210, such that the landing gear legs 26A and 26B may be pivoted about the hinges 42 and 44 moving the legs inwardly beneath the trailer to the position illustrated in FIG. 2.

As best seen in FIG. 3, an assist spring 240 has one end secured to a pin 242 secured on the side of the outer housing 56 and extends upwardly and inwardly therefrom to a pin 244 secured on the channel member 200, such as to provide an aid in moving the leg 26A beneath the trailer. A second assist spring 246 has one end secured on a pin 248 secured on the side of the housing 57 and extends upwardly and inwardly therefrom to a pin 250 secured on the channel member 214 for aiding in moving the leg 26B upwardly beneath the trailer.

Figure 7:
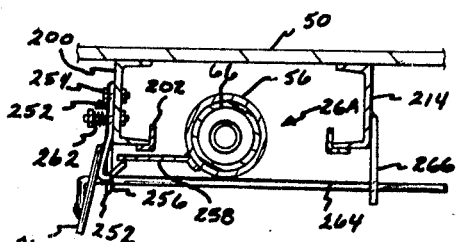
FIG. 7 is a side cross-sectional view taken through the guide channels and the folded-up leg and showing the mechanism for maintaining the landing gear in its folded-up position.

Referring to FIGS. 4 and 7, once the leg 26A has been moved to its horizontal position beneath the trailer, it is secured in place by a latch member, generally indicated at 252. The latch member 252 extends downwardly from the outer surface of the channel member 200 and is secured thereto as by a bolt 254 or the like. The free lower end of the member 252 is bent inwardly as at 256 to engage beneath a tab 258 mounted to the lower portion of the leg 26A. A handle 260 permits the end 256 to be moved away from the tab 258 and a spring mounting 262 urges the end 256 toward the tab 258. Thus, it is apparent that as the legs 26A and 26B are moved upwardly the tabs 258 will engage the end 256 of the latch member 252 and push the ends 256 outwardly. Once the tabs 258 have cleared the ends, the latch member 252 will return to the position shown in FIG. 7 to lock the legs 26A and 26B in the folded position.

As can best be seen in FIGS. 3 and 4, a safety pin 264 is adapted to extend between brackets 266 mounted to the channels 200 and 214 beneath each of the legs 26A and 26B to aid in retaining the legs in the folded-up position. Once the legs have been latched in the folded position by the latch member 252, the pins 264 are inserted lengthwise through apertures in the brackets 266 to bear most of the weight of the legs 26A and 26B and to insure that the legs will not be vibrated loose from the latch member 252.

Referring to FIG. 3, as the legs 26A and 26B are folded under the trailer, the distance between the gear boxes 42 and 178 becomes less. The shaft 180, which extends between the end of the shaft 162 projecting from the gear box 142 and a similar shaft 280 extending from the gear box 178, includes a first tubular member 282 having one end telescopingly receiving the end of the shaft 162. The tubular member 282 is drivingly mounted to the shaft 162 by means of a pin 284 extending through the shaft 162 and a pair of elongated slots 286 and 288 formed in the member 282 with their axes of elongation parallel to the axis of elongation of the member 282, such that the member 282 rotates with the shaft 162 but may move along its axis of elongation with respect to the shaft 162. A second tubular member 290 has one end telescopingly receiving the end of the shaft 280 and is drivingly mounted thereto by means of a pin 292 extending through the shaft 280 and a pair of elongated slots 294 and 296 formed in the member 290 with their axes of elongation parallel to the axis of elongation of the member 290, such that the member 290 may move along its axis of elongation with respect to the shaft 280. Although a third shaft 298 is shown as extending between the tubular members 282 and 290 and having one end fixedly secured in the inner end of the member 282, it is apparent that if preferred the shafts 282 and 298 could be of one piece. The other end of the shaft 298 extends into the inner end of the tubular member 290 and is drivingly connected thereto by a pin 300 extending through the shaft 298 and a pair of elongated slots 302 and 304 formed in the member 290 with their axes of elongation parallel to the axis of elongation of the member 290, such that the member 290 may move along its axis of longation with respect to the shaft 298.

Thus, the length of the shaft 180 connecting the gear boxes 142 and 178 will be shortened by the telescoping action of the members 282, 290 and 298 to accommodate the reduced distance between the gear boxes as the landing gear 20 is moved to its folded-up position.

Still referring to FIG. 3, it will be noted that due to the shaft 180, the gear boxes 142 and 178 maintain their orientation as the legs 26A and 26B are folded under the trailer, and thus the boxes must rotate with respect to the plates 38 and 40. This is accomplished by means of the bracket 144 and a similar bracket on box 178, allowing the gear boxes to rotate with respect to the legs 26A and 26B and slots 275 formed in the plates 38. When the legs 26A and 26B are in the folded-up position, the shaft 150 connecting the gear box 142 to the leg 52 is received in a slot 276 formed in the channel member 200. A slot 278 is formed in the channel member 200 for receiving the shaft connecting the gear box 178 with the leg 54.

Although we have described but one preferred embodiment of our invention, it is to be understood that various changes and revisions can be made therein without departing from the spirit of the invention or the scope of the appended claims.

We claim:

1. In combination with a trailer body, landing gear for supporting an end of said body, said landing gear comprising:
a pair of legs, and means pivotally attaching said legs to opposite sides of said trailer body whereby said legs can be selectively disposed in a vertical trailer supporting position or in a position folded under said trailer; and
means for moving said legs between extended and retracted positions, said means including a shaft extending between and connected to said legs beneath said trailer and said shaft having means to permit its length to be shortened whereby upon folding of said legs to a position beneath said trailer said shaft shortens to a length to permit the shaft to be moved upwardly beneath the trailer.

2. The combination as defined in claim 1 and in which said extending and retracting means includes
gear means carried by said shaft and carried with said legs; and
means mounting said gear means to move said gear means from a position spaced below said trailer body when said legs are in said vertical position to a position upwardly beneath said trailer body when said legs are moved to said folded position.

3. In combination with a trailer landing gear for supporting an end of said trailer, said landing gear comprising:
a pair of support members pivotally attached to the trailer adjacent opposite sides thereof so as to swing transversely of said trailer;
a pair of legs, each including an elongated first member secured to said support members and an elongated second member slidably mounted with respect to each of said first members and movable between a first extended position and a second retracted position;
a gearing arrangement disposed within each of said first and second members for moving each of said second members between its extended and retracted positions;
a pair of gear boxes each mounted on opposite support members and operatively connected to the gearing arrangement disposed in the adjacent leg;
a rotatably mounted shaft extending between said gear boxes;
said rotatably mounted shaft operatively connected to the gearing arrangement in one of said legs and having one end adapted to be connected to a manual crank for simultaneously moving both of said second members between their extended and retracted positions;
a first means for securing said support members in a first position wherein said legs are in an unfolded position; and
a second means for securing said support members in a second position wherein said legs are in a folded-up position.

4. The combination as defined in claim 3, and including means for biasing each of said legs toward its folded-up position.

5. The combination as defined in claim 3, and including a pair of parallel U-shaped elongated channel members extending between said support members adjacent the trailer body;
a pair of elongated braces each having one end pivotally mounted to the first members of opposite legs and the other end slidably mounted in opposite channel members; and
a latching mechanism mounted on each of said channel members for securing the end of said brace mounted therein in a fixed position for securing said legs in their unfolded position.

6. The combination as defined in claim 5, wherein each of said braces includes a roller pivotally mounted on the end mounted in said channel member.

7. The combination as defined in claim 6, wherein each of said channel members is inwardly opening and includes an elongated upwardly extending strip secured to its lower inner edge forming an upwardly opening U-shaped slot for receiving said roller.

8. The combination as defined in claim 5, and including a pair of springs biasing said legs toward their folded-up position and having one end secured to said first members of opposite legs and the other end secured to said channel members.

9. The combination as defined in claim 5, wherein said second means includes a first pair of aligned tabs secured to opposite channel members and extending downwardly therefrom, each of said tabs having an aperture formed adjacent its lower end for receiving a latch bar that supports one of said legs in its folded-up position; and a second pair of aligned tabs secured to opposite channel members and extending downwardly therefrom, each of said tabs of said second pair having an aperture formed adjacent its lower end for receiving a latch bar that supports the other of said legs in its folded-up position.

10. The combination as defined in claim 3, wherein each of said support members is generally flat and triangularly shaped with its upper edge pivotally secured to said trailer, each of said first members of said legs is secured to the inner surface of its associated support member, and each of said gear boxes is pivotally mounted on the inner surface of its associated support member.

11. The combination as defined in claim 3, wherein said rotatably mounted shaft extends outwardly from the upper end of one of said legs.

12. The combination as defined in claim 3, wherein said rotatably mounted shaft extends outwardly from one of said gear boxes.

* * * * *